(12) United States Patent
Koyama et al.

(10) Patent No.: US 11,487,008 B2
(45) Date of Patent: Nov. 1, 2022

(54) DISTANCE MEASURING DEVICE

(71) Applicant: Panasonic Intellectual Property Management Co., Ltd., Osaka (JP)

(72) Inventors: Shinzo Koyama, Osaka (JP); Masato Takemoto, Osaka (JP); Motonori Ishii, Osaka (JP); Yusuke Fukushima, Osaka (JP); Susumu Fukushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 612 days.

(21) Appl. No.: 16/494,960

(22) PCT Filed: Mar. 12, 2018

(86) PCT No.: PCT/JP2018/009375
§ 371 (c)(1),
(2) Date: Sep. 17, 2019

(87) PCT Pub. No.: WO2018/173818
PCT Pub. Date: Sep. 27, 2018

(65) Prior Publication Data
US 2020/0271783 A1    Aug. 27, 2020

(30) Foreign Application Priority Data

Mar. 23, 2017    (JP) .............................. JP2017-057081

(51) Int. Cl.
*G01S 17/08* (2006.01)
*G01S 7/481* (2006.01)
(Continued)

(52) U.S. Cl.
CPC ............ *G01S 17/08* (2013.01); *G01S 7/4816* (2013.01); *G01S 7/4865* (2013.01); *G01S 2007/4975* (2013.01)

(58) Field of Classification Search
CPC ...... G01S 17/08; G01S 7/4816; G01S 7/4865; G01S 2007/4975; G01S 17/42;
(Continued)

(56) References Cited

U.S. PATENT DOCUMENTS 9,036,135 B2 * 5/2015 Giacotto ............... G01S 7/4861
356/5.01
10,094,786 B2 * 10/2018 Hasegawa .............. G01N 21/94
(Continued)

FOREIGN PATENT DOCUMENTS

DE      19908214 A1   9/2000
EP      2597483 A1    5/2013
(Continued)

OTHER PUBLICATIONS

Partial European Search Report dated Feb. 19, 2020 issued for the corresponding EP patent application No. 18771810.1.
(Continued)

*Primary Examiner* — Seung C Sohn
(74) *Attorney, Agent, or Firm* — McDermott Will & Emery LLP

(57) ABSTRACT

A distance measuring device includes a light emitter; a light receiver; a protection cover that is located on an optical path between the light emitter and the light receiver; a mode switch that switches between a first mode and a second mode; a distance calculator that calculates a distance from a target object based on a difference between a time when light is emitted from the light emitter and a time when reflected light is received by the light receiver in the first mode; and an LD light emission intensity adjuster that adjusts a light emission intensity of the light emitter. The adjustment is performed such that a light emission intensity of the light emitter in the second mode is lower than a light emission intensity of the light emitter in the first mode.

6 Claims, 5 Drawing Sheets

(51) Int. Cl.
*G01S 7/486* (2020.01)
*G01S 7/4865* (2020.01)
*G01S 7/497* (2006.01)

(58) Field of Classification Search
CPC .............. G01S 7/4861; G01S 7/4868; G01S 2007/4977; G01S 7/4814; G01S 17/10; G01S 17/93
See application file for complete search history.

(56) References Cited

U.S. PATENT DOCUMENTS

| | | | |
|---|---|---|---|
| 2008/0158042 A1 | 7/2008 | Ishio et al. | |
| 2013/0135606 A1 | 5/2013 | Giacotto | |

FOREIGN PATENT DOCUMENTS

| | | |
|---|---|---|
| EP | 2787368 A1 | 10/2014 |
| JP | H4-307387 A | 10/1992 |
| JP | 5-28759 U | 4/1993 |
| JP | 2003-114277 A | 4/2003 |
| JP | 2006-38686 A | 2/2006 |
| JP | 2008-20203 A | 1/2008 |
| JP | 2011-13135 A | 1/2011 |
| JP | 2011-17666 A | 1/2011 |
| JP | 2016-125898 A | 7/2016 |
| JP | 2017-20841 A | 1/2017 |
| WO | 2007/012878 | 2/2007 |

OTHER PUBLICATIONS

Extended European Search Report dated on Jul. 2, 2020 for the corresponding European Patent Application No. 18771810.1.
International Search Report issued in corresponding International Patent Application No. PCT/JP2018/009375, dated May 15, 2018, with English translation.

\* cited by examiner

DISTANCE MEASURING DEVICE

CROSS-REFERENCE OF RELATED APPLICATIONS

This application is the U.S. National Phase under 35 U.S.C. § 371 of International Patent Application No. PCT/W2018/009375, filed on Mar. 12, 2018, which in turn claims the benefit of Japanese Application No. 2017-057081, filed on Mar. 23, 2017, the entire disclosures of which Applications are incorporated by reference herein.

TECHNICAL FIELD

The present disclosure relates to a distance measuring device that detects a reflector and measures a distance from the reflector based on a light reception signal corresponding to reflected light of irradiated light when the light is irradiated on a predetermined area and the reflected light of the light is received.

BACKGROUND ART

As one of in-vehicle safety mechanisms, a system that monitors a front side, a surrounding area, or a back side of a vehicle by using an image sensor has heretofore been proposed. As a configuration of a distance measuring device that measures a distance from an object in the vicinity of a vehicle, a configuration using the principle of time-of-flight method for measuring a time required for emitted light to be reflected by an object and then received is known. The measured time is converted into the distance from the object (see PTL 1 and PTL 2).

To protect a light emission element or a light receiving element from an external environment, a cover composed of a glass plate or a resin plate, which transmits light, is attached to the distance measuring device. If any foreign material, such as dirt, is on a protection cover, which is located on an optical path of light to be emitted to an object from which a distance is to be measured and on an optical path of light that is reflected from the object and returned, an abnormality occurs in the distance measuring, which may cause an error in the measurement or cause a measurement failure.

CITATION LIST

Patent Literature

PTL 1: Japanese Unexamined Patent Application Publication No. 2006-38686
PTL 2: Japanese Unexamined Utility Model Application Publication No. H05-28759

SUMMARY OF THE INVENTION

Technical Problem

In view of the above-described problems, a principal object of the present disclosure is to provide a distance measuring device capable of detecting foreign material even when the foreign material is on a protection cover.

Solution to Problem

In accordance with an aspect of the present disclosure, there is provided a distance measuring device, including: a light emitter that intermittently emits light; a light receiver that receives reflected light of the light emitted from the light emitter, and includes a photoelectric conversion element including a photodiode that performs photoelectric conversion on the received reflected light to generate a light reception signal; a protection cover that is located on an optical path between the light emitter and the light receiver; a mode switch that switches between a first mode and a second mode; a distance calculator that calculates, in the first mode, a distance from a target object based on a difference between a time when the light emitter emits the light and a time when the light receiver receives the reflected light; and a light emission intensity adjuster that adjusts a light emission intensity of the light emitter, wherein the light emission intensity adjuster performs the adjustment in such a manner that a light emission intensity of the light emitter in the second mode is lower than a light emission intensity of the light emitter in the first mode.

Here, it is possible that the distance calculator examines a variation in intensity of reflected-scattered light on the protection cover based on an output from the light receiver with a weak light intensity from the light emitter in the second mode, and determines based on the examined variation whether any foreign material is on the protection cover.

In accordance with another aspect of the present disclosure, there is provided a distance measuring device, including: a light emitter that intermittently emits light; a light receiver that receives reflected light of the light emitted from the light emitter and includes a photoelectric conversion element including a photodiode that performs photoelectric conversion on the received reflected light to generate a light reception signal; a protection cover that is located on an optical path between the light emitter and the light receiver; a mode switch that switches between a first mode and a second mode; a distance calculator that calculates a distance from a target object based on a difference between a time when the light emitter emits the light and a time when the light receiver receives the reflected light in the first mode; and a voltage adjuster that adjusts a voltage applied to the photodiode, wherein the voltage adjuster performs the adjustment in such a manner that a gain factor of the photodiode in the second mode is lower than a gain factor of the photodiode in the first mode.

Here, it is possible that the distance calculator examines a variation in intensity of reflected-scattered light on the protection cover based on an output from the light receiver adjusted to have a low gain factor in the second mode, and determines based on the examined variation whether any foreign material is on the protection cover.

In accordance with still another aspect of the present disclosure, there is provided a distance measuring device, including: a light emitter that intermittently emits light; a light receiver that receives reflected light of the light emitter from the light emitter and includes a photoelectric conversion element including an avalanche photodiode that performs photoelectric conversion on the received reflected light to generate a light reception signal; a protection cover that is located on an optical path between the light emitter and the light receiver; a mode switch that switches between a first mode and a second mode; a distance calculator that calculates a distance from a target object based on a difference between a time when the light emitter emits the light and a time when the light receiver receives the reflected light in the first mode; and a voltage adjuster that adjusts a voltage applied to the avalanche photodiode, wherein the voltage adjuster performs the adjustment in such a manner that a multiplication factor of the avalanche photodiode in the second mode is lower than a multiplication factor of the avalanche photodiode in the first mode.

Here, it is possible that the distance calculator examines a variation in intensity of reflected-scattered light on the protection cover based on an output from the light receiver adjusted to have a low multiplication factor in the second mode, and determines based on the examined variation whether any foreign material is on the protection cover.

Here, it is also possible that the distance measuring device further includes a cleaner that cleans the protection cover to remove foreign material from the protection cover, when the distance calculator determines that foreign material is on the protection cover.

Advantageous Effects of Invention

Advantageous effects obtained by an embodiment of the present disclosure will be briefly described as follows. That is, it is possible to accurately determine whether any foreign material is on a protection cover, while achieving distance measuring with high sensitivity in a distance measuring device. Further, it is possible to provide a distance measuring device with high reliability by executing cleaning of the protection cover in accordance with a determination result.

DESCRIPTION OF EXEMPLARY EMBODIMENT

Figure 1:
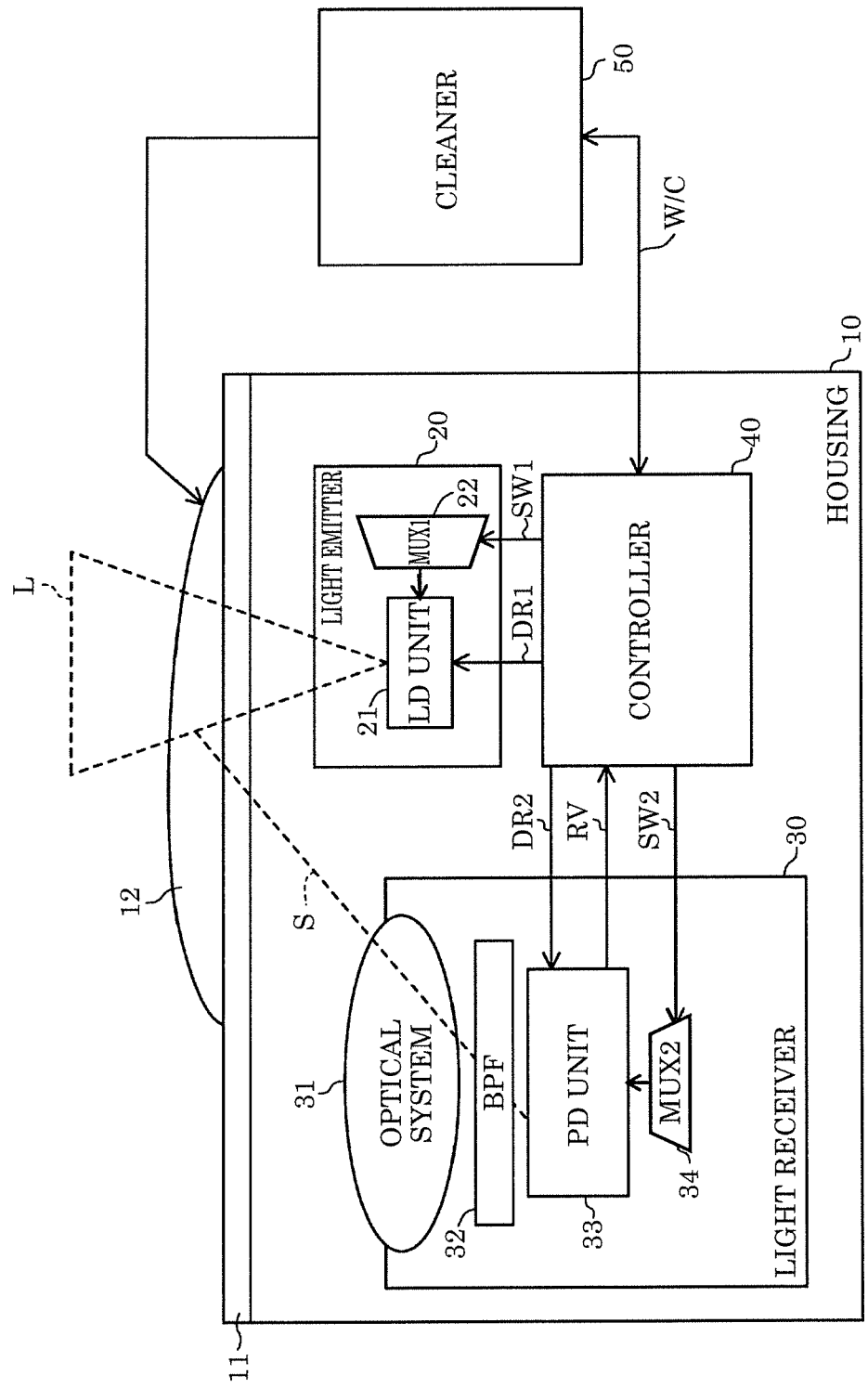
FIG. 1 is a diagram illustrating a schematic configuration example of a distance measuring device according to Embodiment 1 of the present disclosure.

Hereinafter, certain exemplary embodiments are described in greater detail with reference to the accompanying Drawings. It should be noted that all the embodiments described below are preferable examples of the present disclosure. Numerical values, shapes, materials, constituent elements, arrangement positions and the connection configuration of the constituent elements, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations. Furthermore, each figure in the Drawings is a schematic diagram and is not necessarily an exact diagram.

Embodiment 1

According to Embodiment 1 of the present disclosure, a photoelectric conversion element including a photodiode (PD) is adopted as a light receiver. However, in a case where a PD with high sensitivity is used as the light receiver so as to perform distance measuring even at a position far from a target object, if a variation in intensity of reflected-scattered light on a protection cover, which is located near the light receiver and a light emitter, is examined so as to determine whether any foreign material is on the protection cover, the high sensitivity makes it difficult to detect the foreign material. Accordingly, in the case of detecting foreign material, the light emission intensity of the light emitter is adjusted to a lower level, or a voltage applied to the PD is adjusted so that the gain factor of the PD decreases, thereby lowering the substantial sensitivity of the PD.

FIG. 1 is a diagram illustrating a schematic configuration example of a distance measuring device according to Embodiment 1 of the present disclosure. The distance measuring device illustrated in FIG. 1 includes housing 10 incorporating light emitter 20, light receiver 30, and controller 40, light-transmissive protection cover 11 that covers an opening of housing 10, and cleaner 50 for removing foreign material 12 from protection cover 11. Light emitter 20 is a light source including laser diode (LD) unit 21 that emits pulse-like laser light L through a light emission lens and a scanner, as well as first multiplexer (MUX1) 22 that selects a drive voltage for LD unit 21. Light receiver 30 is a distance measuring camera including optical system 31 for focusing light, bandpass filter (BPF) 32 that transmits only light with a specific wavelength, PD unit 33 having a configuration in which a plurality of pixels each including a photodiode (PD) as each photoelectric conversion element are arranged in an array, and second multiplexer (MUX2) 34 that selects a drive voltage for PD unit 33. Controller 40 supplies LD drive voltage switch signal SW1 to first multiplexer 22, supplies LD drive control signal DR1 to LD unit 21, supplies PD voltage switch signal SW2 to second multiplexer 34, supplies PD drive control signal DR2 to PD unit 33, and receives light reception signal RV from PD unit 33. Further, controller 40 supplies cleaning command W to cleaner 50, which is composed of a wiper, a washer, or the like, and receives complete signal C from cleaner 50.

PD unit 33 is composed of a plurality of pixels, and preferably includes a global shutter function capable of controlling light reception timings of all pixels at once. A shutter timing is controlled from controller 40 as a timing relative to a light emission timing of LD unit 21 based on the global shutter function, and a subject located in a specific distance interval can be detected from the distance measuring device. The distance interval is scanned in a distance direction, thereby enabling controller 40 to acquire distance images as images with different distances even when a plurality of subjects is present at different positions.

The distance measuring device illustrated in FIG. 1 examines a variation in intensity of reflected-scattered light S on protection cover 11, thereby determining whether any foreign material 12 is on protection cover 11.

As illustrated in FIG. 1, for example, in an in-vehicle distance measuring device, if foreign material 12 is on a front portion of LD unit 21, the amount of emitted light that can pass through protection cover 11 decreases. Further, reflected light from a target object is absorbed or scattered by foreign material 12, with the result that the amount of reflected light that can pass through protection cover 11 decreases. Thus, when the amount of incident light on PD unit 33 is less than or equal to a predetermined amount, the accuracy of measuring a light round trip time deteriorates. In other words, it can be considered that the reliability of a distance measured value is impaired or a maximum distance that can be measured decreases and safety deteriorates. Accordingly, it is important to detect and remove foreign material 12. Further, as illustrated in FIG. 1, in a structure in which light emitter 20 and light receiver 30 are arranged in the same housing 10, light applied to foreign material 12 is scattered, and a part of light reaches light receiver 30. Even when there is no foreign material 12, light reflected on protection cover 11 reaches light receiver 30. Specifically, in most cases, foreign material 12 is dirt, a dead bug, or the like, which is only several millimeters or less, and as the distance, light is reflected from substantially the same distance, so that the intensity of reflected-scattered light S on protection cover 11 varies depending on the presence or absence of foreign material 12.

However, if the light output from light emitter 20 is reflected and scattered by protection cover 11 and foreign material 12, this position is extremely close to light emitter 20. Accordingly, the light is reflected while an extremely strong light intensity is maintained. As described above, when an element with high sensitivity is used as the photoelectric conversion element of light receiver 30, the high sensitivity makes it difficult to discriminate reflected-scattered light S derived only from protection cover 11 from reflected-scattered light S generated due to protection cover 11 and foreign material 12.

Accordingly, as a result of an intensive study, the present inventors have found that in the case of detecting foreign material, when the light emission intensity of light emitter 20 is adjusted so as to be decreased, or the gain factor of the PD in light receiver 30 is adjusted so as to be decreased, reflected-scattered light S derived only from protection cover 11 can be distinguished from reflected-scattered light S generated due to protection cover 11 and foreign material 12 by lowering the substantial sensitivity of the PD.

Figure 2:
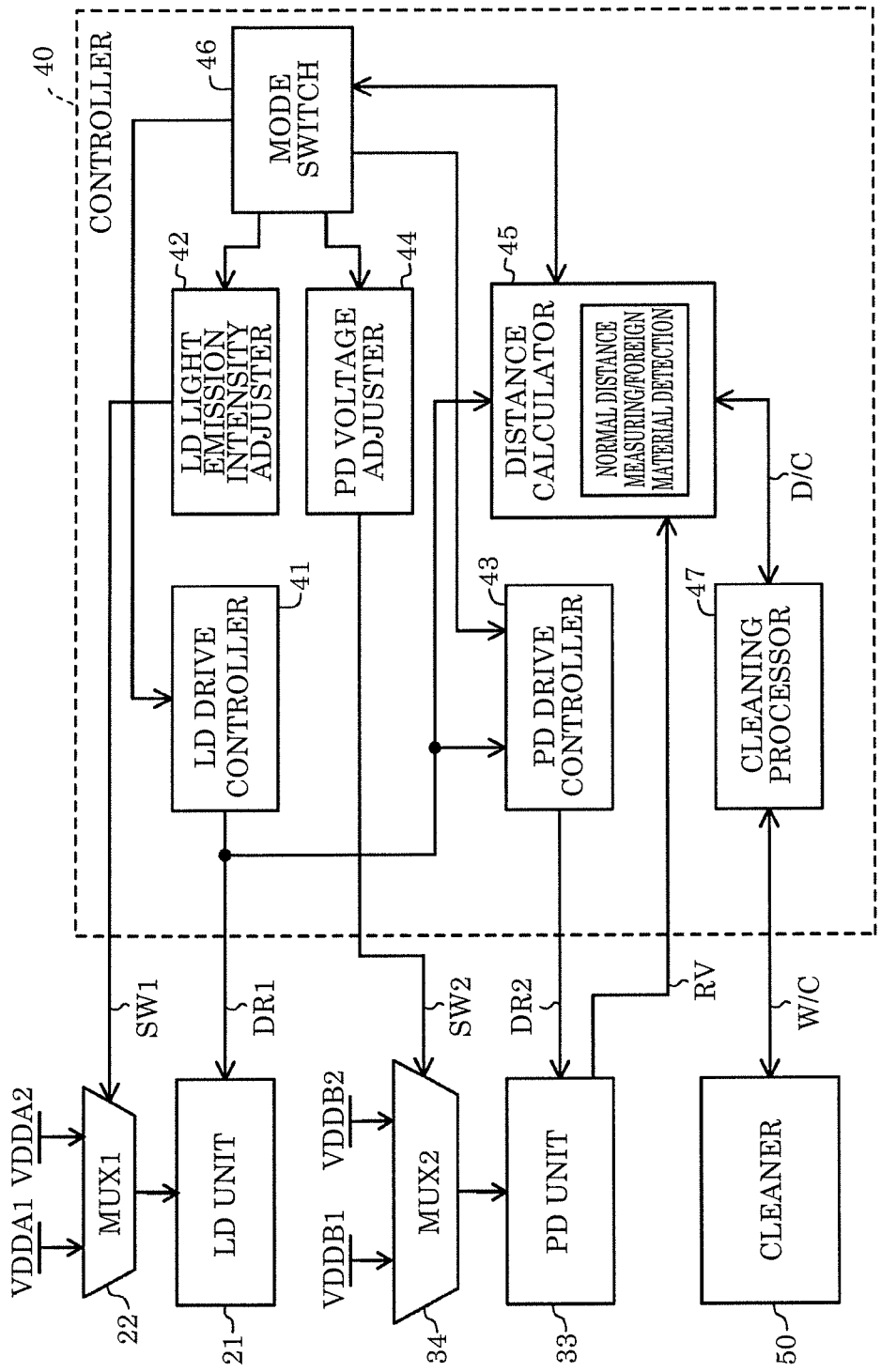
FIG. 2 is a block diagram illustrating a detailed configuration example of a controller illustrated in FIG. 1 and peripheral blocks of the controller.

FIG. 2 is a block diagram illustrating a detailed configuration example of controller 40 illustrated in FIG. 1 and its peripheral blocks. Controller 40 includes LD drive controller 41, LD light emission intensity adjuster 42, PD drive controller 43, PD voltage adjuster 44, distance calculator 45, mode switch 46, and cleaning processor 47. Further, FIG. 2 illustrates, as peripheral blocks of controller 40, LD unit 21, first multiplexer (MUX1) 22, PD unit 33, second multiplexer 34, and cleaner 50.

Mode switch 46 supplies, to each unit, a mode switch signal indicating switching between a normal distance measuring mode for measuring a distance from a target object and a foreign material detection mode for detecting foreign material 12 on protection cover 11. By LD drive voltage switch signal SW1, LD light emission intensity adjuster 42 supplies high-voltage VDDA1 to LD unit 21 and adjusts the light emission intensity to a higher level in the normal distance measuring mode, and LD light emission intensity adjuster 42 supplies low-voltage VDDA2 to LD unit 21 and adjusts the light emission intensity to a lower level in the foreign material detection mode. LD drive controller 41 controls the light emission timing using the LD drive control signal DR1. By PD voltage switch signal SW2, PD voltage adjuster 44 supplies high voltage VDDB1 to PD unit 33 and adjusts the PD gain factor to a higher level in the normal distance measuring mode, and PD voltage adjuster 44 supplies low voltage VDDB2 to PD unit 33 and adjusts the PD gain factor to a lower level in the foreign material detection mode. PD drive controller 43 receives LD drive control signal DR1 to notify a light emission timing, and controls a light reception operation by PD drive control signal DR2. Distance calculator 45 receives LD drive control signal DR1 to notify a light emission timing and light reception signal RV from PD unit 33, and performs different operations in the normal distance measuring mode and the foreign material detection mode, respectively. Specifically, in the normal distance measuring mode, distance calculator 45 calculates a distance from a target object based on a difference between a time when light is emitted from LD unit 21 and a time when reflected light is received by PD unit 33. On the other hand, distance calculator 45 examines a variation in intensity of reflected-scattered light S on protection cover 11 based on an output from PD unit 33, or based on an output from PD unit 33 adjusted to have a low gain factor, with a weak light intensity from LD unit 21 in the foreign material detection mode, thereby determining whether foreign material 12 is on protection cover 11. If foreign material 12 is detected, distance calculator 45 supplies foreign material detection signal D to cleaning processor 47. Cleaning processor 47 which has received foreign material detection signal D issues cleaning command W to cleaner 50. Upon receiving complete signal C from cleaner 50, cleaning processor 47 transmits complete signal C to distance calculator 45, and notifies distance calculator 45 of completion of cleaning processing. Distance calculator 45 which has received complete signal C requests mode switch 46 to shift to the normal distance measuring mode from the foreign material detection mode.

Figure 3:
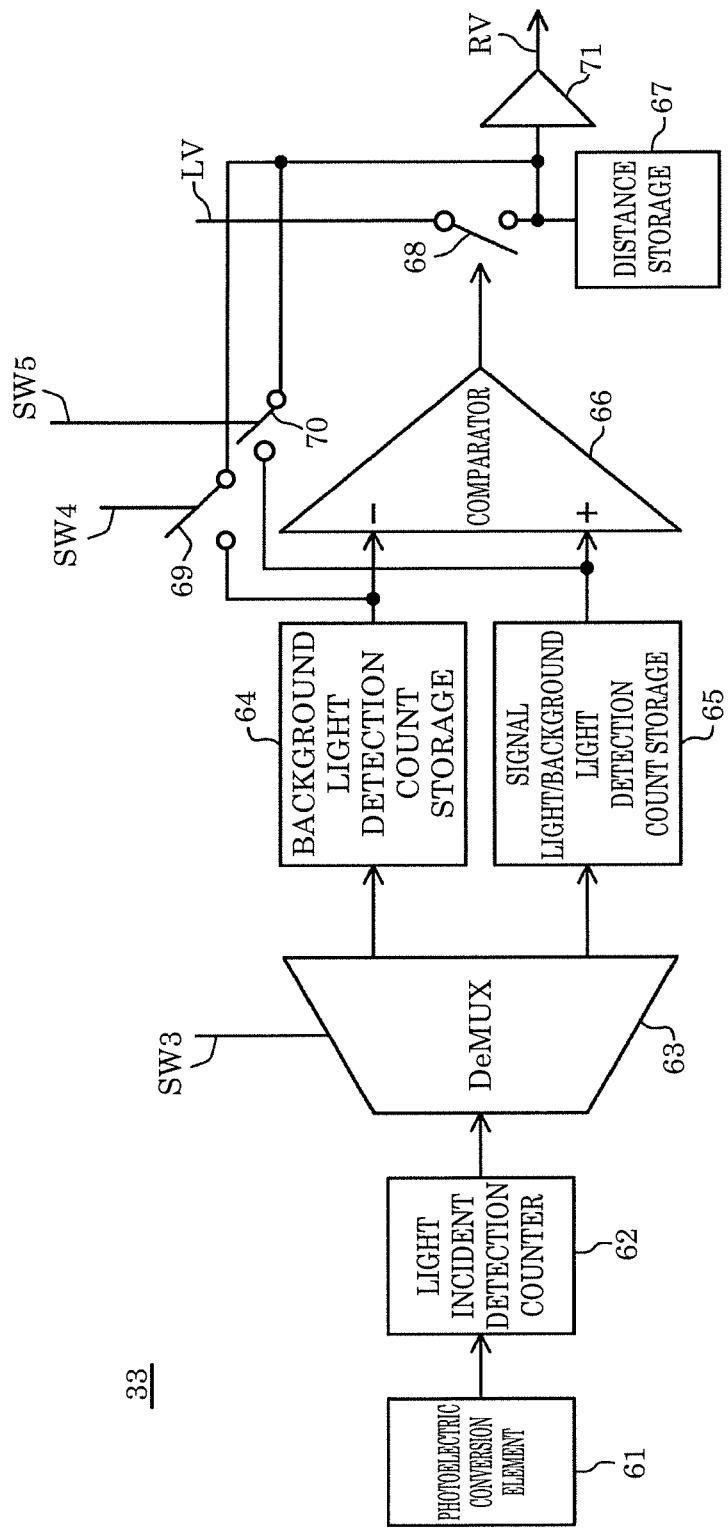
FIG. 3 is a block diagram illustrating a detailed configuration example of a PD unit illustrated in FIG. 1.

FIG. 3 is a block diagram illustrating a detailed configuration example of PD unit 33 illustrated in FIG. 1 and illustrates one pixel of PD unit 33. The configuration illustrated in FIG. 3 includes photoelectric conversion element 61 including a PD, light incident detection counter 62 that counts the number of PD outputs, demultiplexer (DeMUX) 63, background light detection count storage 64, signal light/background light detection count storage 65, comparator 66 that compares outputs from both storages 64 and 65, distance storage 67, first, second, and third switches 68, 69, and 70, and output amplifier 71. Demultiplexer 63 sorts outputs from light incident detection counter 62 into background light detection count storage 64 and signal light/background light detection count storage 65 in response to sorting control signal SW3. First switch 68 turns on/off in response to an output from comparator 66, and outputs distance voltage LV. Second switch 69 turns on/off in response to first count output control signal SW4, and transmits an output from background light detection count storage 64 to each of distance storage 67 and output amplifier 71. Third switch 70 turns on/off in response to second count output control signal SW5, and transmits an output of signal light/background light detection count storage 65 to each of distance storage 67 and output amplifier 71. Output amplifier 71 outputs light reception signal RV.

For example, if the shutter is released in 10 nanoseconds, it can be detected whether an object is present within a distance interval of 1.5 m in consideration of a light round trip time with a constant velocity of light. When the light emission timing of LD unit 21 and the shutter timing of PD unit 33 are gradually shifted relatively to each other, objects arranged at different distance intervals can each be detected. However, since the effect of background light, such as sunlight, is large during daytime, the light intensity of background light is first acquired, and then the magnitude of the light intensity of only background light and the magnitude of the light intensity of both signal light and background light are determined. If the magnitude of the latter is greater than the magnitude of the former, a determination that an object is present at the distance interval is written to distance storage 67. The use of a PD with high sensitivity makes it possible to secure a sufficient signal margin with respect to circuit noise at a subsequent stage. However, when the magnitude of only background light is compared with the magnitude of both signal light and background light, a PD with high sensitivity is not suitable for comparing the intensity of signals. Accordingly, FIG. 3 illustrates a configuration in which the magnitude of only background light and the magnitude of both signal light and background light are compared by counting the number of times of detecting photons. As for the distance, comparator 66 determines whether the number of times is large or small. In FIG. 3, first and second count output control signals SW4 and SW5 are driven to thereby enable output of each of the detection count of only background light and the detection count of both signal light and background light to the outside of PD unit 33, and these values are determined by controller 40.

Figure 4:
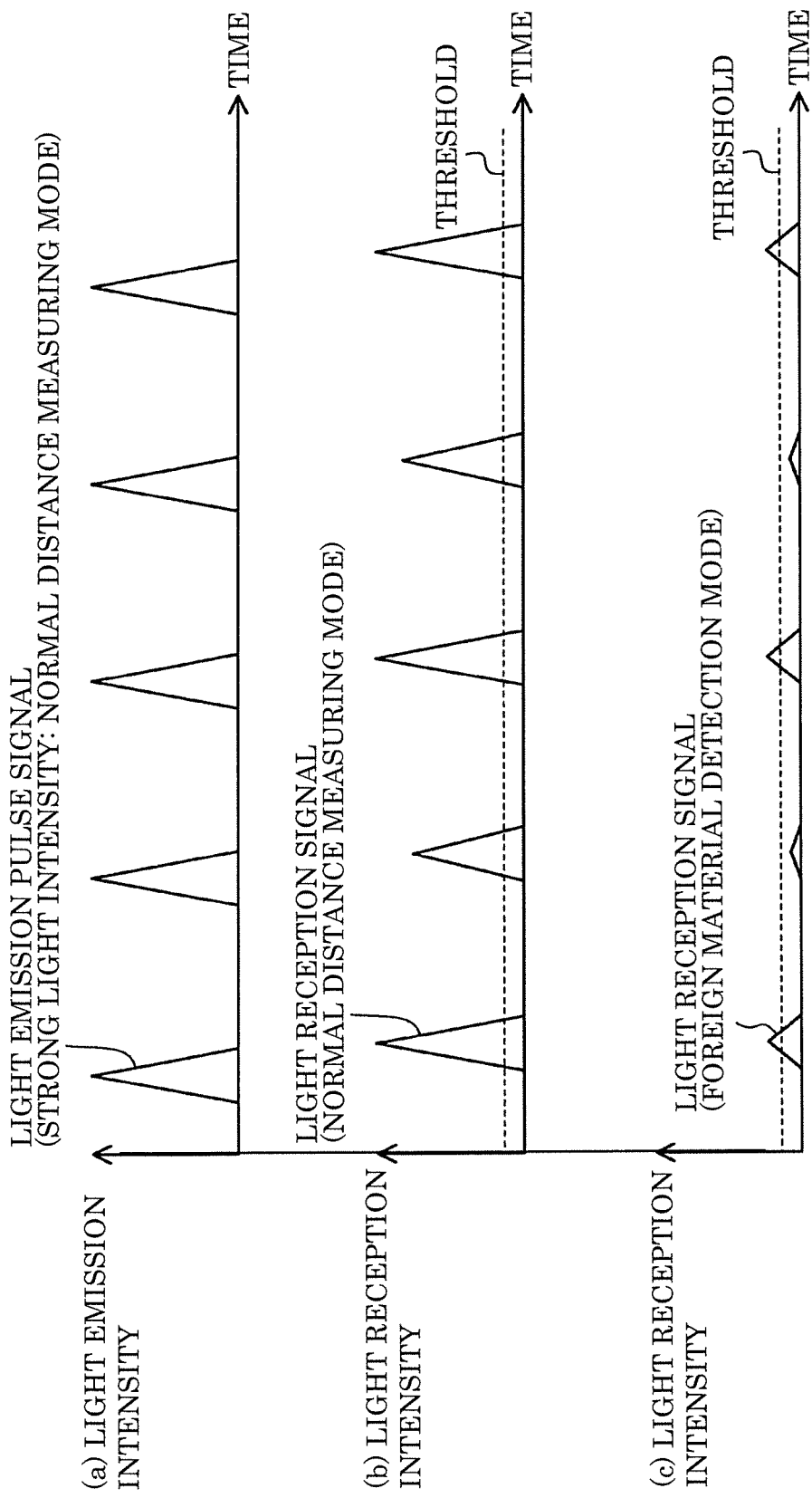
FIG. 4 includes timing diagrams each illustrating an operation example of the distance measuring device illustrated in FIG. 1 using an LD light emission intensity adjuster.

(a) to (c) in FIG. 4 are timing diagrams each illustrating an operation example of the distance measuring device illustrated in FIG. 1 using LD light emission intensity adjuster 42. In the normal distance measuring mode, as illustrated in (a) of FIG. 4, a light emission pulse signal with a strong light intensity is emitted from LD unit 21. A light reception signal level of PD unit 33 in this normal distance measuring mode always exceeds a threshold, which is a foreign material determination level, as illustrated in (b) of FIG. 4, regardless of whether foreign material 12 is present or not. Accordingly, LD light emission intensity adjuster 42 adjusts the light emission pulse signal with a weak light intensity to be emitted from LD unit 21 in the foreign material detection mode. Thus, the light reception signal level of PD unit 33 in the foreign material detection mode can be lower than the threshold as illustrated in (c) of FIG. 4, with the result that reflected-scattered light S derived only from protection cover 11 can be distinguished from reflected-scattered light S generated due to protection cover 11 and foreign material 12.

Figure 5:
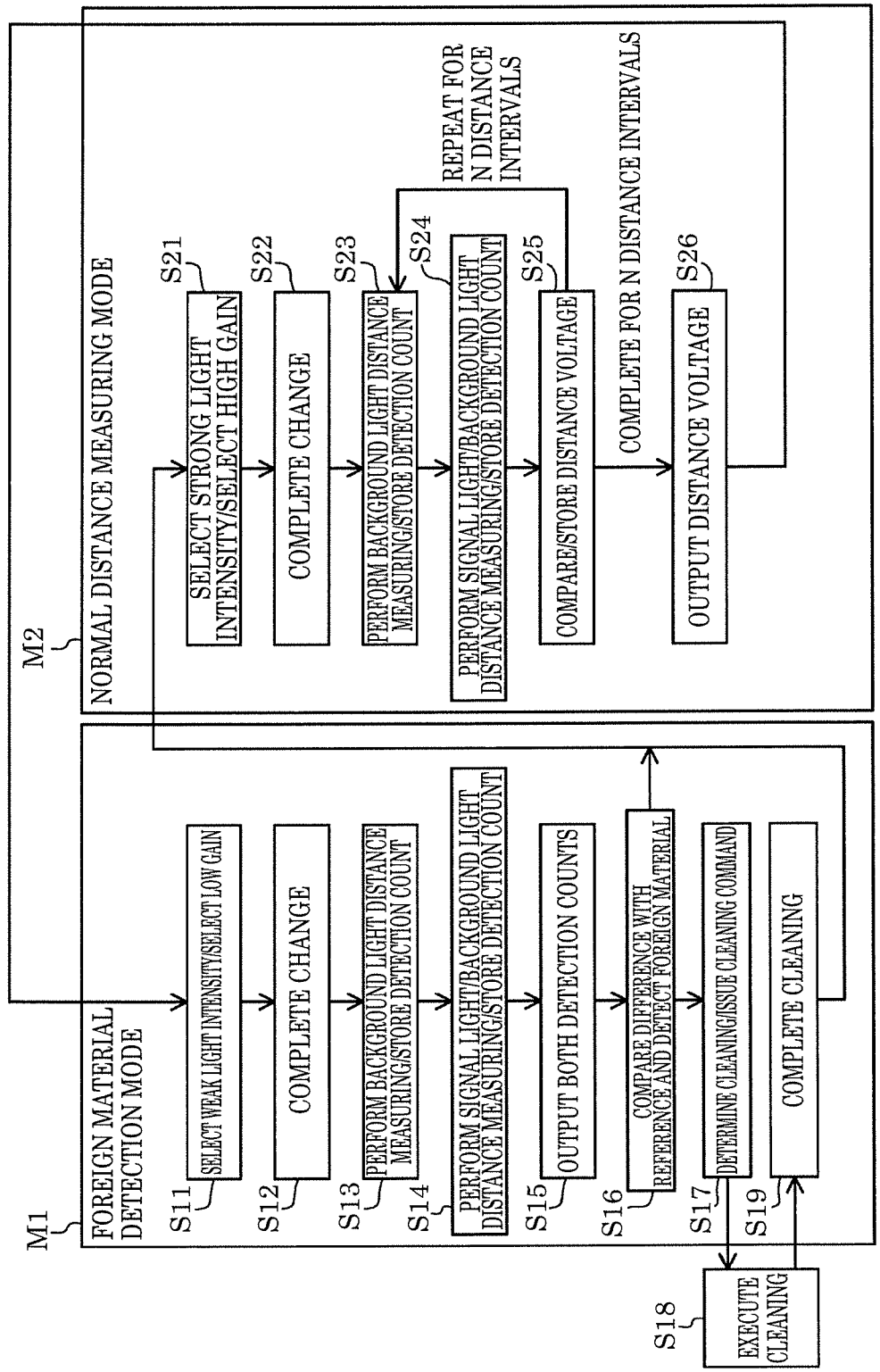
FIG. 5 is a flowchart illustrating an example of an overall operation of the distance measuring device illustrated in FIG. 1.

FIG. 5 is a flowchart illustrating an example of an overall operation example of the distance measuring device illustrated in FIG. 1. The operation of the distance measuring device illustrated in FIG. 1 is divided into an operation in foreign material detection mode M1 from step S11 to step S19 and an operation in normal distance measuring mode M2 from step S21 to step S26.

First, the operation in foreign material detection mode M1 will be described. In step S11, a weak light intensity is selected by LD light emission intensity adjuster 42 and a low gain factor is selected by PD voltage adjuster 44. After waiting for completion of change of the drive voltage in first and second multiplexers 22 and 34 in step S12, in step S13, in a state where the light emission from LD unit 21 is interrupted, photoelectric conversion element 61 and light incident detection counter 62 counts detections of only background light to perform distance measuring (background light distance measuring) and background light detection count storage 64 stores the detection count (detection count storing). In step S14, in a state where there is signal light from LD unit 21, photoelectric conversion element 61 and light incident detection counter 62 counts detections of both signal light and background light to perform distance measuring (signal light/background light distance measuring) and signal light/background light detection count storage 65 stores the detection count (detection count storing). In step S15, first count output control signal SW4 turns on second switch 69, and the detection count stored in background light detection count storage 64 is output to controller 40. Further, second count output control signal SW5 turns on third switch 70, and the detection count stored in signal light/background light detection count storage 65 is output to controller 40. In step S16, distance calculator 45 of controller 40 examines foreign material by comparing the difference between the stored detection counts with a reference preliminarily acquired in a state where there is no foreign material. Examples of foreign material 12 include an object that reflects light and an object that absorbs light, and both the objects deteriorate the distance measuring performance. Accordingly, if there is an increase or decrease that exceeds a certain amount in the intensity of reflected-scattered light S on protection cover 11, it is determined that foreign material 12 is on protection cover 11. If it is determined that there is no foreign material on protection cover 11, the processing shifts from step S16 to the operation in normal distance measuring mode M2. However, if it is determined that there is foreign material on protection cover 11, the processing proceeds to step S17 from step S16. In step S17, cleaning processor 47 determines cleaning and issues cleaning command W to cleaner 50. In step S18, cleaner 50 executes cleaning of protection cover 11 so as to remove foreign material 12. Then, when the completion of cleaning is confirmed in step S19, the processing shifts to the operation in normal distance measuring mode M2.

Next, the operation of normal distance measuring mode M2 will be described. In step S21, a strong light intensity is selected by LD light emission intensity adjuster 42 and a high gain factor is selected by PD voltage adjuster 44. After waiting for completion of change of the drive voltage in first and second multiplexers 22 and 34 in step S22, in step S23, in a state where the light emission from LD unit 21 is interrupted, photoelectric conversion element 61 and light incident detection counter 62 perform background light distance measuring and background light detection count storage 64 performs detection count storing. In step S24, in a state where there is signal light from LD unit 21, photoelectric conversion element 61 and light incident detection counter 62 perform signal light/background light distance measuring and signal light/background light detection count storage 65 performs detection count storing. In step S25, comparator 66 compares the stored detection counts with each other, and as a result of the comparison, comparator 66 stores distance voltage LV in distance storage 67. The term "distance voltage" used herein refers to a voltage corresponding to a measured distance. If a distance is calculated by calculation, a voltage value used for calculation may be used. If a distance value is converted using a conversion table or the like, the voltage value may be used. The operation of these steps S23 to S25 is repeated at N (N is an integer) distance intervals. At a time point when these operations are completed at the N distance intervals, information about the distance voltage stored in distance storage 67 in step S26 is output to distance calculator 45 of controller 40. Distance calculator 45 calculates a distance from a target object at each of the N distance intervals based on the received information about the distance voltage. After the processing of step S26 is finished, the processing shifts to the operation in foreign material detection mode M1.

Embodiment 2

In each pixel included in a distance measuring device according to Embodiment 2 of the present disclosure, an avalanche photodiode (APD) is used for a photoelectric converter, instead of a normal PD. Note that the other constituent elements are similar to those of Embodiment 1, and thus detailed descriptions thereof are omitted, except that the PD illustrated in FIGS. 1 to 3 is replaced with an APD.

When an APD is used for the photoelectric converter, in general, a high reverse bias voltage, such as about 10 V to 100 V, is applied. A normal PD generates one electron or hole for one photon incident on the photoelectric converter, while the APD generates a plurality of electrons or holes for one photon incident on the photoelectric converter. The number of electrons or holes to be generated is referred to as a multiplication factor.

For example, in the distance measuring device illustrated in FIG. 2, by PD voltage switch signal SW2, PD voltage adjuster 44 supplies high reverse bias voltage VDDB1 to PD unit 33 in the normal distance measuring mode, and adjusts the multiplication factor in PD unit 33 to a higher level. In particular, in a state called a Geiger mode, in which about 10000 or more multiplication factors are set, a distance signal with an extremely high SN ratio can be obtained.

Note that, in general, the APD applies a high reverse bias voltage as described above to operate in the Geiger mode with a high multiplication factor. When the voltage to be applied is lowered to about several volts, an operation similar to that of the normal PD is shown.

In the foreign material detection mode, voltage VDDB2 to be supplied to PD unit 33 is adjusted in such a manner that the APD multiplication factor is decreased, or the operation of the normal PD is performed. Thus, a variation in the intensity of reflected-scattered light S on protection cover 11 is determined based on the output from PD unit 33 whose operation is adjusted, thereby making it possible to determine whether foreign material 12 is on protection cover 11.

As described above, according to Embodiments 1 and 2 described above, it is possible to accurately determine whether foreign material 12 is on protection cover 11, which is positioned on an optical path between light emitter 20 and light receiver 30, while achieving distance measuring with high sensitivity in the distance measuring device. Further, it is possible to provide a distance measuring device with high reliability by providing cleaner 50 and executing cleaning of protection cover 11.

Note that in Embodiments 1 and 2 described above, controller 40 includes both LD light emission intensity adjuster 42 and PD voltage adjuster 44, but instead may include at least one of these adjusters.

INDUSTRIAL APPLICABILITY

As described above, a distance measuring device according to the present disclosure has an advantageous effect that it is possible to accurately determine whether any foreign material is on a protection cover, while achieving distance measuring with high sensitivity, and is especially useful as an in-vehicle distance measuring device and the like.

The invention claimed is:
1. A distance measuring device, comprising:
a light emitter that intermittently emits light;
a light receiver that receives reflected light of the light emitted from the light emitter and includes a photoelectric conversion element including a photodiode that performs photoelectric conversion on the received reflected light to generate a light reception signal;
a protection cover that is located on an optical path between the light emitter and the light receiver;
a mode switch that switches between a first mode and a second mode;
a distance calculator that calculates a distance from a target object based on a difference between a time when the light emitter emits the light and a time when the light receiver receives the reflected light in the first mode; and
a voltage adjuster that adjusts a voltage applied to the photodiode,
wherein the voltage adjuster performs the adjustment in such a manner that a gain factor of the photodiode in the second mode is lower than a gain factor of the photodiode in the first mode.
2. The distance measuring device according to claim 1, wherein the distance calculator examines a variation in intensity of reflected-scattered light on the protection cover based on an output from the light receiver adjusted to have a low gain factor in the second mode, and determines based on the examined variation whether any foreign material is on the protection cover.
3. The distance measuring device according to claim 1, further comprising:
a cleaner that cleans the protection cover to remove foreign material from the protection cover, when the distance calculator determines that foreign material is on the protection cover.
4. A distance measuring device, comprising:
a light emitter that intermittently emits light;
a light receiver that receives reflected light of the light emitter from the light emitter and includes a photoelectric conversion element including an avalanche photodiode that performs photoelectric conversion on the received reflected light to generate a light reception signal;
a protection cover that is located on an optical path between the light emitter and the light receiver;
a mode switch that switches between a first mode and a second mode;
a distance calculator that calculates a distance from a target object based on a difference between a time when the light emitter emits the light and a time when the light receiver receives the reflected light in the first mode; and
a voltage adjuster that adjusts a voltage applied to the avalanche photodiode,
wherein the voltage adjuster performs the adjustment in such a manner that a multiplication factor of the avalanche photodiode in the second mode is lower than a multiplication factor of the avalanche photodiode in the first mode.
5. The distance measuring device according to claim 4, wherein the distance calculator examines a variation in intensity of reflected-scattered light on the protection cover based on an output from the light receiver adjusted to have a low multiplication factor in the second mode, and determines based on the examined variation whether any foreign material is on the protection cover.
6. The distance measuring device according to claim 4, further comprising:
a cleaner that cleans the protection cover to remove foreign material from the protection cover, when the distance calculator determines that foreign material is on the protection cover.

* * * * *